April 12, 1949.  H. E. SMITH  2,466,666
CONTAINER
Filed Feb. 18, 1947

INVENTOR.
HARRY E. SMITH.
BY
ATTORNEYS.

Patented Apr. 12, 1949

2,466,666

UNITED STATES PATENT OFFICE 2,466,666

CONTAINER

Harry E. Smith, Little Silver, N. J., assignor to Celanese Corporation of America, a corporation of Delaware Original application June 19, 1945, Serial No. 600,346. Divided and this application February 18, 1947, Serial No. 729,377

1 Claim. (Cl. 220—42)

This invention relates to a plastic container comprising a cylindrical body and a beaded open end, together with a beaded cover for fitting over said beaded open end. This application is a division of my application S. No. 600,346, filed June 19, 1945, wherein is claimed a novel apparatus for forming beaded containers and covers therefor.

An object of this invention is to provide a beaded plastic container body and beaded plastic cover therefor of such construction as to permit easy closure and to provide a very tight or vacuum fit when the beaded plastic container body is closed by the beaded cover.

Other objects and advantages of this invention will appear from the following detailed description and drawing.

In its broadest aspect, the beading apparatus of this invention comprises a holder for a cylindrical plastic body adapted to be rotated and a heated forming or beading plate of novel design, the rotating holder being arranged to bring the edge of the cylindrical plastic body into contact with a forming channel in the beading plate.

Figure 1:
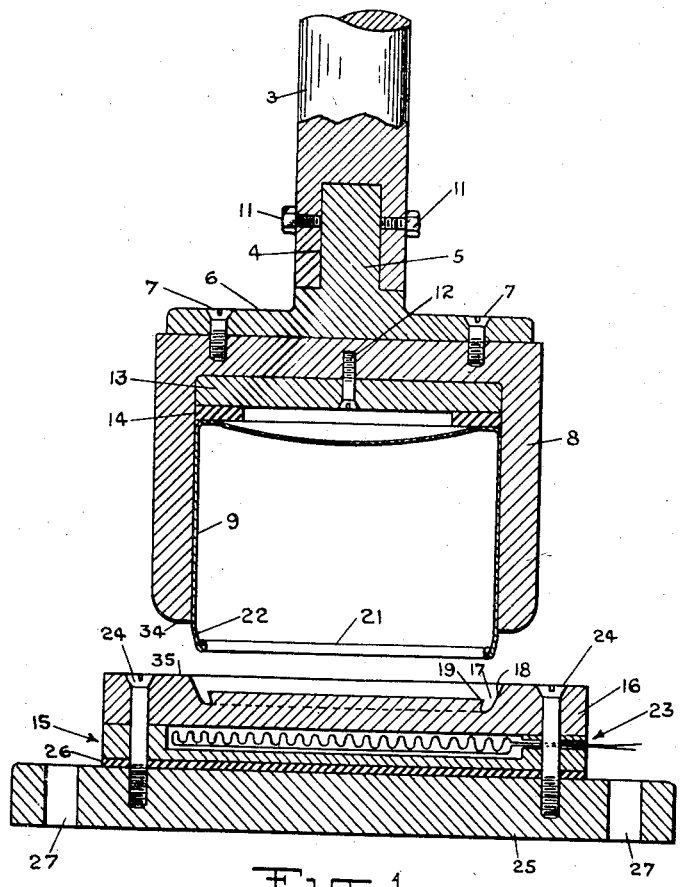
Figure 2:
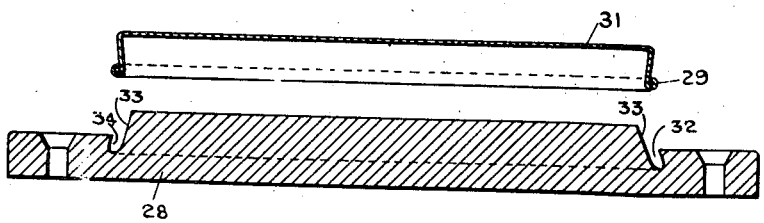

In the accompanying drawing wherein a preferred embodiment of the beading apparatus of this invention is shown, Figure 1 is a vertical cross-sectional view of the beading apparatus showing a plastic container body, the open end of which is to be beaded, being held therein, the beading plate being designed to produce an internal bead, and Figure 2 is a vertical cross-sectional view showing a beading plate designed to produce an external bead and a cover which has been externally beaded.

Like reference numerals indicate like parts throughout both views of the drawing.

Referring now to the drawing for a detailed description of this invention, the reference numeral 3 indicates a spindle of metal or other suitable material adapted to be rotated, raised or lowered by suitable means (not shown). Spindle 3 is provided with an aperture 4 to receive a projection 5 of a support 6 to which is attached, as by screws 7, a cylindrical holder 8 for holding the plastic body to be beaded indicated by reference numeral 9. The projection 5 is held in the spindle aperture 4 by means of screw bolts 11. Supported by holder 8 and held in position therein by means of a screw 12 is a locating block 13, the thickness of which depends upon the height of the plastic body being operated upon. The locating block may be made of a single thickness of material or may be built up of a number of layers of varying thicknesses. The thickness of the locating block 13, in a single layer or in multiple layers, should be such that ⅜ of an inch of the side walls protrudes below the bottom of the holder 8 when the plastic body being beaded is inserted therein in contact with the friction body 14. The support 6 is preferably of metal, while the holder 8 and the locating block 13 are preferably made of a low heat conducting material such as Masonite or the like. An annular pad 14 of suitable thickness and preferably of soft rubber is fixed to the locating block 13 by cementing the same thereto, the pad functioning as a friction member.

Aligned with the holder 8 is a beading assembly generally indicated by reference numeral 15. This assembly comprises a forming- or beading-plate 16 having an annular forming channel 17 of novel design. Thus, for producing an internal bead on the open end of the cylindrical plastic body, the side walls of the forming channel taper inwardly at an angle of 20° from the vertical, the outer wall 18 being of greater length than the inner wall 19 and both of the walls being substantially parallel with each other. The forming channel of this invention not only produces a bead, such as is shown at 21, on the open end of the cylindrical body but also performs a shaping operation on the wall of said body adjacent to the bead 21 causing it to taper inwardly as shown at 22.

The beading plate 16 is made of any suitable metal and is mounted on an electrical heating unit generally indicated by reference numeral 23. The beading plate and heating unit are attached by means of screws 24 to a base plate 25 which is preferably made of a low heat conducting material, such as Masonite or similar material, and is insulated from said base plate 25 by means of an asbestos gasket 26. The base plate 25 may be rigidly fastened to the bed of the heating members in proper alignment with the holder 8 by bolts inserted in holes 27 provided in said base plate.

In Figure 2, there is shown a beading plate 28 for producing an external bead 29 on a cover 31 for the plastic container body. In this beading plate, the side walls of the forming channel 32 are tapered outwardly and as in forming channel 17 the side walls are substantially parallel with each other; however, inner side wall 33 is longer than the outer side wall 34. The construction of the forming channel 32 also effects a shaping action on the wall of said cover, causing the wall to taper outwardly from the bead as shown in the drawing, forming an angle of about 10° from the vertical.

When the cover 31, beaded and shaped in accordance with this present invention, is placed on the container body 9, beaded and shaped in accordance with this invention, there is produced a very tight or vacuum fit making the same particularly useful as container for face powder and like finely divided materials.

In operation, a plastic body 9 is inserted in holder 8 and is rotated by suitable means operatively connected to spindle 3 at a speed of about 750 R. P. M. The spindle and holder are then lowered by any suitable means until the edge of the container body contacts the tapered side 18 (side 33 in Figure 2) of the forming channel 17 in beading plate 16. The further downward travel of the rotating spindle 3 carries the edge of the plastic body along tapered side 18 and completely around the circumference of the forming channel of the beading plate 16, which is preferably maintained at a temperature of about 290° F. by means of the heating unit 23, until the bottom surface 34 of holder 8 bears firmly on the outer top surface 35 of beading plate 16, thus forming a complete internal bead and at the same time, as the result of the inward forming action on the container side wall on the tapered side 18, in association with the contractive effect of the bead, imparts a slight inward taper of about 15° from the vertical on the wall of the plastic body to a point about ⅛ of an inch from the beaded portion. The spindle 3 is then raised and the beaded and shaped container body is removed from holder 8.

In the beading of plastic container bodies or covers, as heretofore commonly practiced, the forming channel was positioned at right angles to the upper face of the beading plate. Thus, the dimensional relation between the outside diameter of the forming channel at the beginning of the radius and the outside diameter of the unbeaded side wall was such that the side wall of the fully beaded body or cover was positioned at right angles to the horizontal plane of the closed end. Therefore, in accordance with prior practice, the side wall of the internally beaded bodies and the externally beaded covers being positioned at right angles to the horizontal plane of the closed ends resulted in a vertical telescopic fit between the outer surface of the body and the inner surface of the cover. No provision was made for variables in the expansion and contraction characteristics of the plastic. Accordingly, for a constantly tight closure in the finished and closed container entire dependence was placed upon a close dimensional fit.

With the present invention, however, many advantages flow from the use of the improved beading apparatus, particularly the improved construction of the forming channel. Thus, there are produced cylindrical shaped plastic container bodies and covers, from the same die assembly, with internally or externally beaded open ends that effect a highly satisfactory fit. This is due to the fact that the dimensional relation between the outside diameter of the unbeaded body, or the inside diameter of the unbeaded cover, and the diameter of the forming channel at the beginning of the bead radius, the 20° taper of the forming channel above the bead radius in association with the contractive effect from the plastic of the beaded operation, result in completed containers with fully beaded and slightly tapered open ends which permit of an easy closure and which forms a very tight or vacuum fit and provides for normal dimensional variation so as to constantly maintain a tight closure.

The container bodies and covers beaded and shaped in accordance with the present invention may have a basis of any suitable thermoplastic film or sheet material. For example, the container bodies and covers may be made from thermoplastic material containing nitrocellulose of any suitable degree of nitration, or an organic derivative of cellulose such as organic esters of cellulose and cellulose ethers. Examples of organic esters of cellulose are cellulose acetate, cellulose propionate and cellulose butyrate, while examples of cellulose ethers are ethyl cellulose and benzyl cellulose. The container bodies and covers may also be made from mixed esters of cellulose, such as cellulose aceto-propionate, cellulose aceto-butyrate, or ether esters of cellulose, such as ethyl cellulose acetate. Film or sheet material of thermoplastic synthetic resins and polymerization products may also be employed for producing container bodies and covers in accordance with this invention.

It is to be understood that the foregoing detailed description is merely given by way of illustration and that many variations may be made therein without departing from the spirit of my invention.

Having described my invention, what I desire to secure by Letters Patent is:

A plastic container comprising a cylindrical body having an internally beaded open end and an inwardly tapered portion adjacent to said beaded end and a cover for said cylindrical body, said cover having an annular flange forming a wall inwardly tapered toward its free edge and terminating in an externally beaded open end, the depth of the flange being greater than the width of the inwardly tapered portion of the body, said cover having an internal diameter at the beaded end substantially the same as the external diameter of the body below the tapered portion of said body, whereby when the cover is applied to the body the beaded portion of the cover extends below the tapered portion of said body to form a tight or vacuum fit.

HARRY E. SMITH.

REFERENCES CITED

The following references are of record in the file of this patent:

UNITED STATES PATENTS

| Number | Name | Date |
| --- | --- | --- |
| 123,837 | Patterson | Feb. 20, 1872 |
| 1,193,461 | Hisgen et al. | Aug. 1, 1916 |
| 1,266,685 | Hothersall | May 21, 1918 |
| 2,099,056 | Ferngren | Nov. 16, 1937 |